US009888251B2

(12) United States Patent
Chang (10) Patent No.: US 9,888,251 B2
(45) Date of Patent: Feb. 6, 2018

(54) VIDEO PROCESSING APPARATUS CAPABLE OF GENERATING OUTPUT VIDEO PICTURES/SEQUENCE WITH COLOR DEPTH DIFFERENT FROM COLOR DEPTH OF ENCODED VIDEO BITSTREAM (71) Applicant: MEDIATEK INC., Hsin-Chu (TW)

(72) Inventor: Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/208,626

(22) Filed: Jul. 13, 2016

(65) Prior Publication Data

US 2016/0323589 A1    Nov. 3, 2016

Related U.S. Application Data (63) Continuation of application No. 13/726,547, filed on Dec. 25, 2012, now Pat. No. 9,414,058.

(51) Int. Cl.
    *H04N 19/186*    (2014.01)
    *H04N 19/105*    (2014.01)
    *H04N 19/117*    (2014.01)
    *H04N 19/132*    (2014.01)
    *H04N 19/139*    (2014.01)
    (Continued)

(52) U.S. Cl.
    CPC ......... *H04N 19/186* (2014.11); *H04N 19/105* (2014.11); *H04N 19/117* (2014.11); *H04N 19/132* (2014.11); *H04N 19/139* (2014.11); *H04N 19/182* (2014.11); *H04N 19/44* (2014.11); *H04N 19/86* (2014.11)

(58) Field of Classification Search
    CPC .. H04N 19/105; H04N 19/117; H04N 19/132; H04N 19/139; H04N 19/86; H04N 19/182; H04N 19/186; H04N 19/44
    See application file for complete search history.

(56) References Cited

U.S. PATENT DOCUMENTS

| 5,828,383 A | 10/1998 | May |
| 2003/0007695 A1* | 1/2003 | Bossut ............... G06T 9/00 382/239 |

(Continued)

FOREIGN PATENT DOCUMENTS

| CN | 101622878 A | 1/2010 |
| CN | 101828399 A | 9/2010 |
| WO | 2012166818 A2 | 12/2012 |

*Primary Examiner* — Thai Tran
*Assistant Examiner* — Christopher T Braniff
(74) *Attorney, Agent, or Firm* — Winston Hsu (57) ABSTRACT A video processing apparatus includes a control unit, a storage device, a video decoder and a video processor. The control unit is arranged for generating a color depth control signal. The video decoder is coupled to the storage device and the control unit, and arranged for referring to the color depth control signal to enable a target video decoding mode selected from a plurality of supported video decoding modes respectively corresponding to different output color depths, and decoding an encoded video bitstream under the target video decoding mode to generate decoded video pictures (sequence) to the storage device. The video processor is coupled to at least the storage device, and arranged for processing picture data derived from the data buffered in the storage device to generate output video pictures (sequence) to a display apparatus.

19 Claims, 10 Drawing Sheets (51) Int. Cl.
*H04N 19/182* (2014.01)
*H04N 19/44* (2014.01)
*H04N 19/86* (2014.01)

(56) References Cited

U.S. PATENT DOCUMENTS

| | | | |
|---|---|---|---|
| 2006/0197777 A1* | 9/2006 | Cha | H04N 19/34 345/600 |
| 2009/0097558 A1* | 4/2009 | Ye | H04N 19/176 375/240.13 |
| 2009/0323804 A1 | 12/2009 | Gao | |
| 2010/0091840 A1* | 4/2010 | Gao | H04N 19/105 375/240.2 |
| 2011/0228855 A1 | 9/2011 | Gao | |
| 2012/0311070 A1* | 12/2012 | BianRosa | H04N 21/234309 709/217 |

* cited by examiner

VIDEO PROCESSING APPARATUS CAPABLE OF GENERATING OUTPUT VIDEO PICTURES/SEQUENCE WITH COLOR DEPTH DIFFERENT FROM COLOR DEPTH OF ENCODED VIDEO BITSTREAM

CROSS REFERENCE TO RELATED APPLICATION

This is a continuation of U.S. application Ser. No. 13/726,547, filed on Dec. 25, 2012 and incorporated herein by reference.

BACKGROUND

The disclosed embodiments of the present invention relate to generating output video pictures (sequence) to a display apparatus, and more particularly, to a video processing apparatus capable of generating output video pictures (sequence) with a color depth different from a color depth of an encoded video bitstream.

Generally speaking, a color depth or bit depth is the number of bits used to indicate the color of a single pixel in a video frame. Hence, the video frame with a higher color depth setting would have a broader range of distinct colors. The 8-bit color depth is conventionally used by many video standards. However, with the development of display apparatuses such as liquid crystal display (LCD) apparatuses, the display apparatuses are capable of supporting higher color depths such as a 10-bit color depth, a 12-bit color depth and a 16-bit color depth. Hence, new video standards supporting color depths higher than the 8-bit color depth are proposed correspondingly.

However, it is possible that a conventional display apparatus which only supports a lower display color depth is still used by the user. When the video content carried by an encoded video bitstream with a higher color depth setting is to be displayed on the display apparatus supporting a lower display color depth, the encoded video bitstream should be processed by a video processing apparatus for properly generating output video pictures (sequence) to the display apparatus. For example, a conventional video processing apparatus may decode and process the encoded video bitstream under a higher color depth mode to obtain preliminary video pictures (sequence), and then generate the output video pictures (sequence) with a lower color depth setting by truncating the preliminary video pictures (sequence) with the higher color depth setting to satisfy the display color depth requirement of the display apparatus. Though the display apparatus is driven by the output video pictures (sequence) with the lower color depth setting, most circuit elements in the conventional video processing apparatus are required to operate in the higher color depth mode, which results in computing resource overhead and unnecessary power consumption.

SUMMARY

In accordance with exemplary embodiments of the present invention, a video processing apparatus capable of generating output video pictures (sequence) with a color depth different from a color depth of an encoded video bitstream is proposed to solve the above-mentioned problem.

According to a first aspect of the present invention, an exemplary video processing apparatus is disclosed. The exemplary video processing apparatus includes a control unit, a storage device, a video decoder and a video processor. The control unit is arranged for generating a color depth control signal. The video decoder is coupled to the storage device and the control unit, and is arranged for referring to the color depth control signal to enable a target video decoding mode selected from a plurality of supported video decoding modes respectively corresponding to different output color depths, and decoding an encoded video bitstream under the target video decoding mode to generate decoded video pictures (sequence) to the storage device. The video processor is coupled to at least the storage device, and is arranged for processing picture data derived from the data buffered in the storage device to generate output video pictures (sequence) to a display apparatus.

According to a second aspect of the present invention, an exemplary video processing apparatus is disclosed. The exemplary video processing apparatus includes a storage device, a video decoder and a video processor. The video decoder is coupled to the storage device, and arranged for decoding an encoded video bitstream and accordingly generating decoded video pictures (sequence) to the storage device. The video processor is coupled to the storage device, and arranged for processing picture data derived from the data buffered in the storage device to generate output video pictures (sequence) to a display apparatus. Each color component in the encoded video bitstream has a first color depth different from a color depth of the decoded video pictures (sequence).

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to provide a video processing apparatus capable of supporting different video decoding modes respectively corresponding to different color depths and/or different video processing modes respectively corresponding to different color depths. Thus, a portion of a proposed video processing apparatus may be configured to operate in a lower color depth mode when the incoming encoded video bitstream to be decoded and processed has a higher color depth setting. In this way, the computing resource overhead and/or unnecessary power consumption may be avoided. Further details of the proposed video processing apparatus are described as below.

Figure 1:
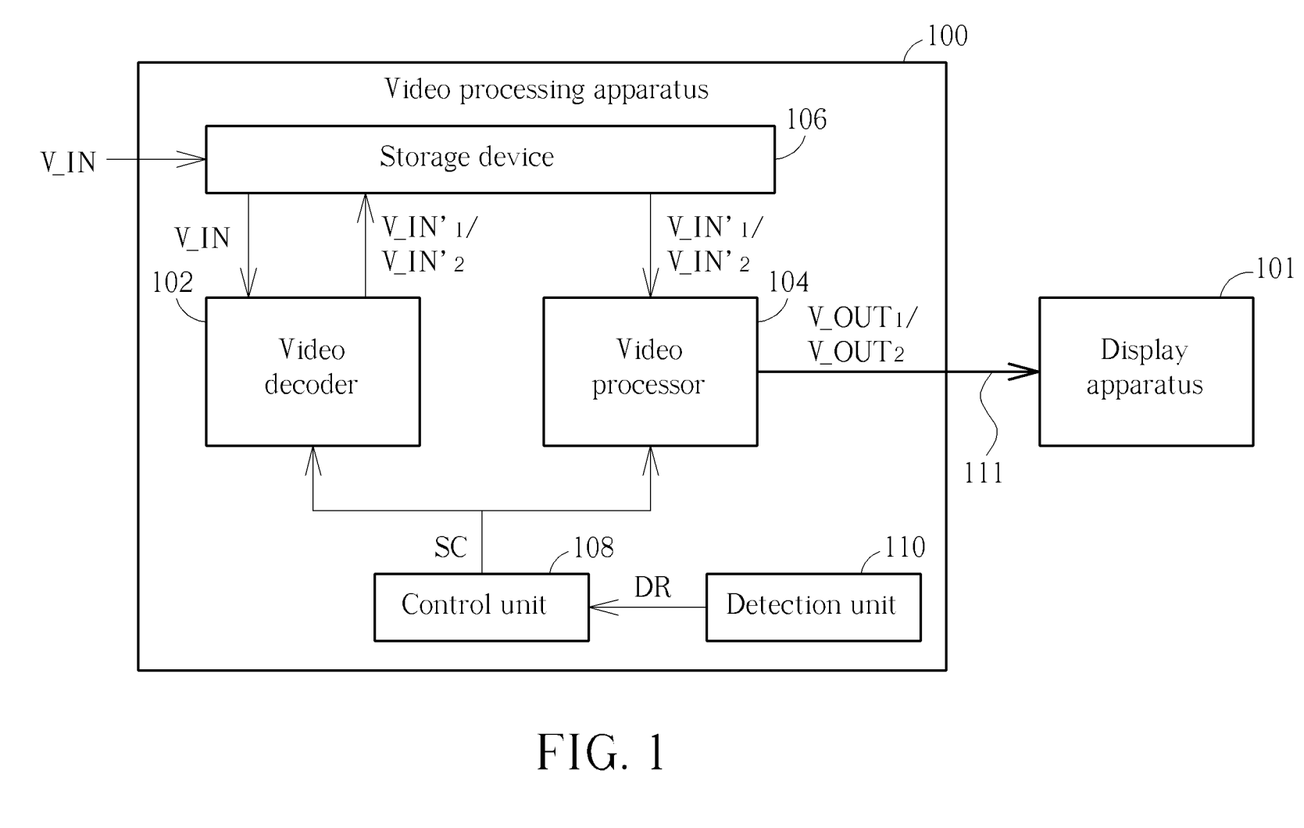
FIG. 1 is a block diagram illustrating a video processing apparatus according to a first embodiment of the present invention.

Please refer to FIG. 1, which is a block diagram illustrating a video processing apparatus according to a first embodiment of the present invention. The exemplary video processing apparatus 100 includes a video decoder 102, a video processor (e.g., a display engine) 104, a storage device 106, a control unit 108, and a detection unit 110. The video processing apparatus 100 is arranged for processing an encoded video bitstream V_IN received from a video/image source, where each of the color components (e.g., YUV, YCbCr, RGB or YCoCg) has a color depth CD1 (e.g., an 8-bit color depth, a 10-bit color depth, a 12-bit color depth or a 16-bit color depth). Therefore, the encoded video bitstream V_IN may carry one or more encoded pictures to be decoded and processed by the video processing apparatus 100. The encoded video bitstream V_IN derived from the external image/video source, for example, through wired/wireless transmission means is stored into the storage device 106 for further processing. By way of example, but not limitation, the storage device 106 may be implemented using a volatile memory such as a dynamic random access memory (DRAM). In this embodiment, the video decoder 102 and the video processor 104 are both controlled by a color depth control signal SC. Specifically, the control unit 108 is arranged to generate the color depth control signal SC according to a detection result DR generated from the detection unit 110. The color depth control signal SC is provided to the video decoder 102 and the video processor 104 to indicate which color depth setting should be employed.

In one exemplary design, the detection unit 110 is coupled to the control unit 108, and arranged for generating the detection result DR by detecting configuration information of the display apparatus 101. For example, the display apparatus 101 may be disposed in a mobile phone, a digital television (DTV) or a tablet, and may be coupled to the video processing apparatus 100 via a display interface 111, such as a high-definition multimedia interface (HDMI), a wireless HDMI, a low-voltage differential signaling (LDVS), an embedded panel interface (EPI), a mobile industry processor interface (MIPI), a digital signal interface (DSI), a wireless fidelity (WiFi) display interface, or a mobile high-definition link (MHL). The display apparatus 101 may transmit its configuration information (e.g., a display depth color) to the video processing apparatus 100 via the display interface 111. Hence, the detection unit 110 monitors the display interface 111 to receive the configuration information generated from the display apparatus 101, and generates the detection result DR indicative of the display color depth setting currently used by the display apparatus 101. After receiving the detection result DR, the control unit 108 sets the color depth control signal SC correspondingly.

As shown in FIG. 1, the video decoder 102 is coupled to the control unit 108, and arranged for referring to the color depth control signal SC to enable a target video decoding mode selected from a plurality of supported video decoding modes respectively corresponding to different output color depths, and decoding the encoded video bitstream V_IN under the target decoding mode to generate the decoded video pictures (sequence) V_IN'$_1$/V_IN'$_2$. When the control unit 108 determines that each color component of the encoded video bitstream V_IN has the color depth CD1 equal to the display color depth of the display apparatus 101 as indicated by the detection result DR, the control unit 108 controls the video decoder 102 to operate in a video decoding mode corresponding to an output color depth equal to CD1. Hence, the video decoder 102 decodes the encoded video bitstream V_IN and generates the decoded video pictures (sequence) V_IN'$_1$ having the same color depth CD1 possessed by the encoded video bitstream V_IN. For example, when each of the display color depth and the color depth CD1 is an 8-bit color depth, each circuit element in the video decoder 102 is configured to operate in an 8-bit color depth mode.

However, when the control unit 108 determines that each color component of the encoded video bitstream V_IN has the color depth CD1 different from (e.g., higher than) the display color depth of the display apparatus 101 as indicated by the detection result DR, the control unit 108 controls the video decoder 102 to operate in another video decoding mode corresponding to an output color depth different from CD1. Hence, the video decoder 102 decodes the encoded video bitstream V_IN and generates the decoded video pictures (sequence) V_IN'$_2$ having another color depth CD2 different from the color depth CD1 possessed by the encoded video bitstream V_IN. For example, when the color depth CD1 is a 10-bit/12-bit/16-bit color depth and the display color depth is an 8-bit color depth, at least a portion of circuit elements in the video decoder 102 may be configured to operate in an 8-bit color depth mode.

Figure 2:
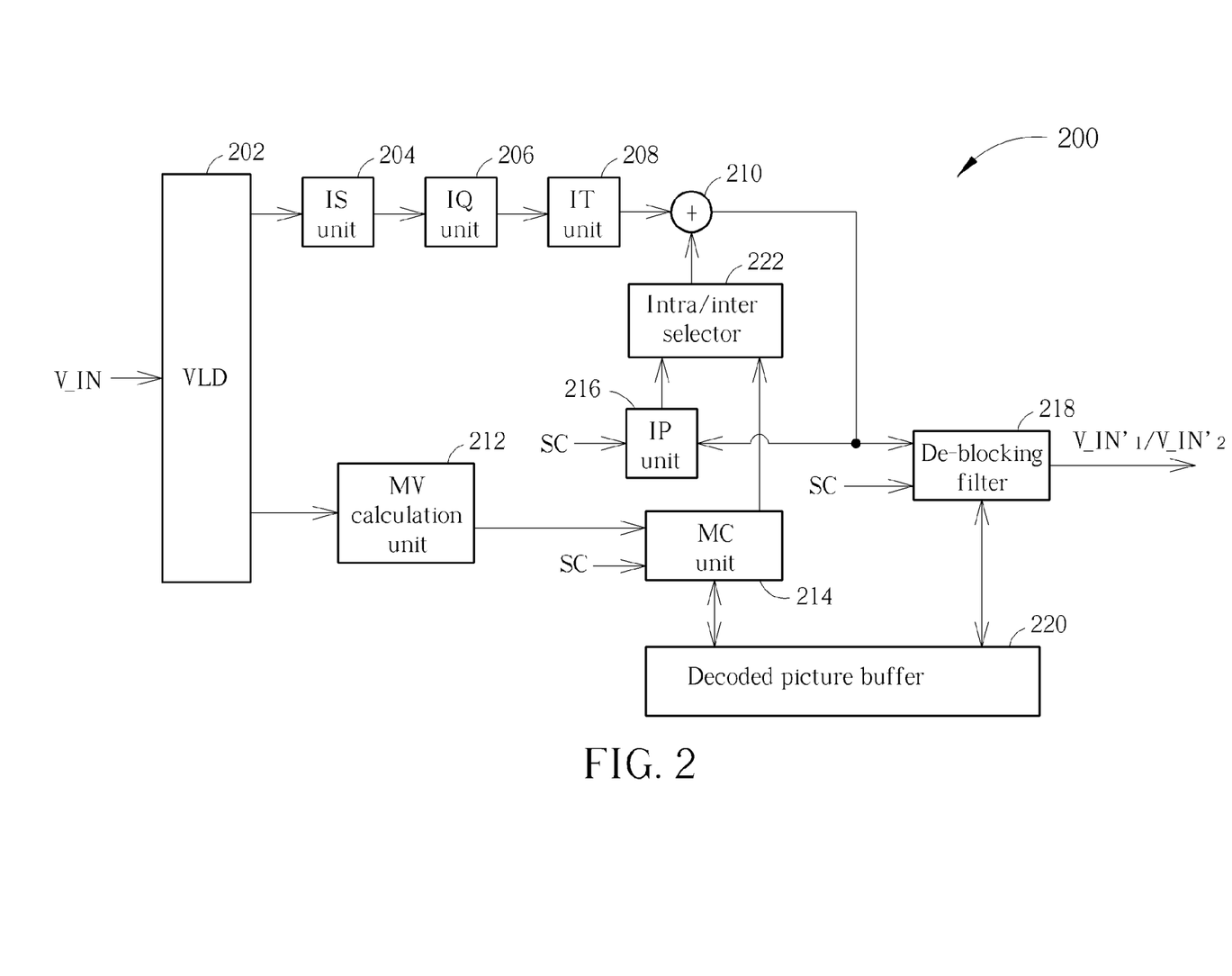
FIG. 2 is a diagram illustrating one exemplary implementation of the video decoder shown in FIG. 1.

Please refer to FIG. 2, which is a diagram illustrating one exemplary implementation of the video decoder 102 shown in FIG. 1. The video decoder 102 may be implemented using the video decoder 200 shown in FIG. 2. By way of example, but not limitation, the video decoder 200 is a moving picture experts group (MPEG) based decoder, and may include a variable length decoder (VLD) 202, an inverse scan (IS) unit 204, an inverse quantization (IQ) unit 206, an inverse transform (IT) unit 208, an adder 210, a motion vector (MV) calculation unit 212, a motion compensation (MC) unit 214, an intra-prediction (IP) unit 216, a de-blocking filter 218, a decoded picture buffer 220, and an intra/inter selector 222. As a person skilled in the art can readily understand basic operational principles of each circuit element shown in FIG. 2, further description is omitted here for brevity. The major difference between the proposed video decoder 200 and a conventional H.264/MPEG decoder is that the MC unit 214, the IP unit 216 and the de-blocking filter 218 are controlled by the color depth control signal SC. Therefore, when the video decoder 200 is operated in a target video decoding mode for a desired output color depth, the MC unit 214, the IP unit 216 and the de-blocking filter 218 maybe configured to generate/process each color component using a color depth different from a color depth used by other circuit elements in the same video decoder 200. For example, when the color depth CD1 of the encoded video bitstream V_IN is a 10-bit/12-bit/16-bit color depth and the display color depth is an 8-bit color depth, each of VLD 202, IS unit 204, IQ unit 206, IT unit 208 and MV calculation unit 212 would operate in a 10-bit/12-bit/16-bit color depth mode, but each of the MC unit 214, the IP unit 216 and the de-blocking filter 218 uses an 8-bit color depth to process each color component. In this way, the computing resource overhead and/or unnecessary power consumption can be mitigated or avoided. It should be noted that the color depth truncation used for converting a color component with a 10-bit/12-bit/16-bit color depth into a color component with an 8-bit color depth may be performed in one of the MC unit 214, the IP unit 216 and the de-blocking filter 218, depending upon actual design consideration. Preferably, the last stage (i.e., the de-blocking filter 218) is used for performing the desired color depth truncation to achieve optimum picture quality of the decoded video pictures (sequence) V_IN'$_2$.

Figure 3:
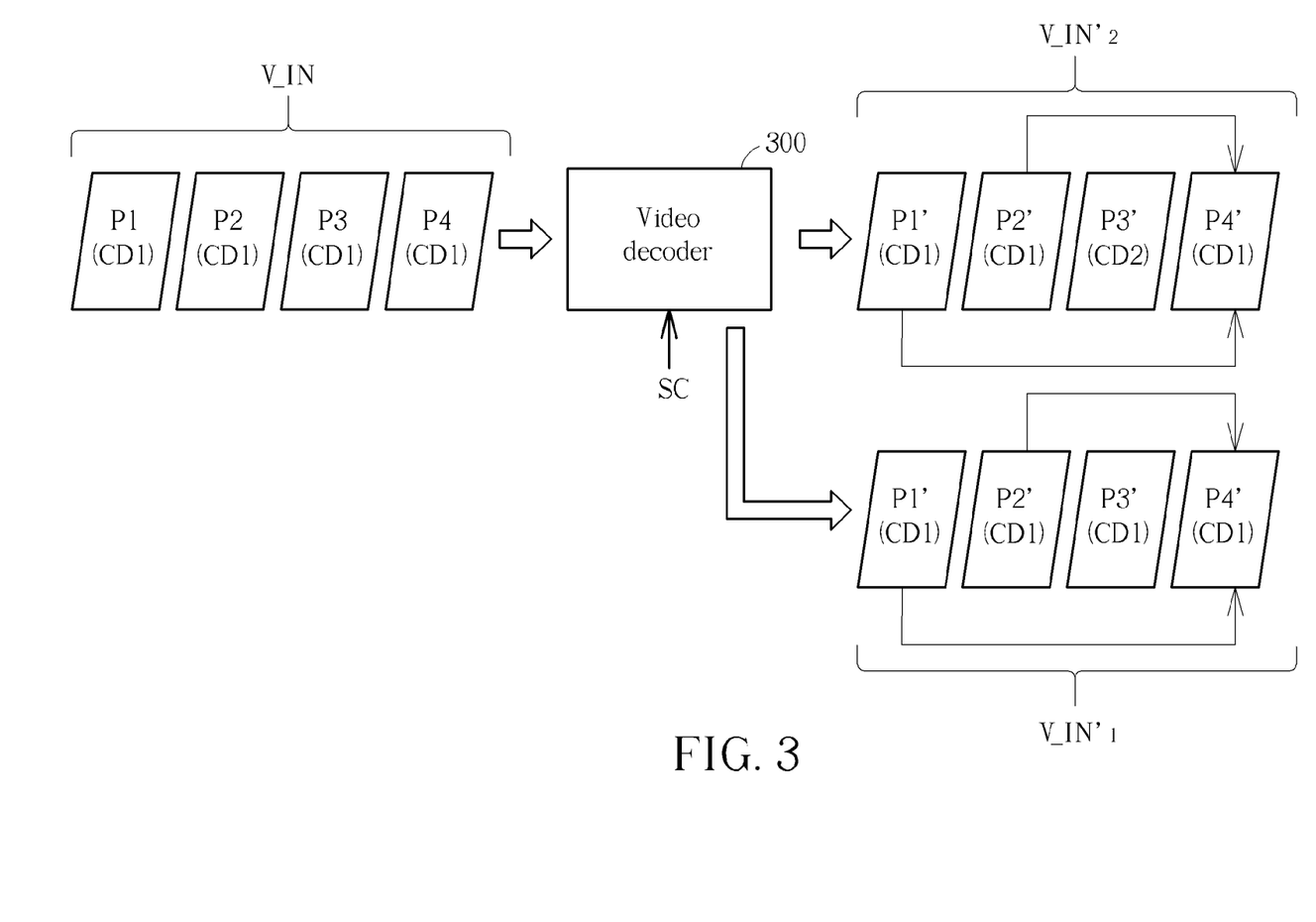
FIG. 3 is a diagram illustrating another exemplary implementation of the video decoder shown in FIG. 1.

Please refer to FIG. 3, which is a diagram illustrating another exemplary implementation of the video decoder 102 shown in FIG. 1. The video decoder 102 may be implemented using the video decoder 300 shown in FIG. 3. The encoded video bitstream V_IN include encoded reference pictures (e.g., P1, P2 and P4) and encoded non-reference pictures (e.g., P3), where a decoding result of the encoded reference picture maybe referenced for decoding another picture, and a decoding result of the encoded non-reference picture would never be referenced for decoding another picture. For example, in a case where the encoded video bitstream V_IN complies with the MPEG specification, intra-coded pictures (I-pictures) and predictive pictures (P-pictures) are reference pictures, while bi-predictive pictures (B-pictures) are non-reference pictures. When the color depth CD1 of each color component in the encoded video bitstream V_IN is a 10-bit/12-bit/16-bit color depth and the display color depth is an 8-bit color depth (i.e., the color depth of the encoded video bitstream V_IN is different from the display color depth of the display apparatus 101), the video decoder 300 is instructed by the color depth control signal SC to enable one video decoding mode for outputting the decoded video pictures (sequence) V_IN'$_2$ including reference pictures (e.g., P1', P2' and P4') and non-reference pictures (e.g., P3'), where each color component in the reference pictures has the same color depth CD1 (i.e., 10-bit/12-bit/16-bit color depth) possessed by the encoded video bitstream V_IN, and each color component in the non-reference pictures has another color depth CD2 (i.e., 8-bit color depth) different from the color depth CD1 possessed by the encoded video bitstream V_IN. Thus, the system resource used by the following processing of the non-reference pictures can be reduced. It should be noted that the video decoder 300 may further add a flag to each non-reference picture for informing the following stage (e.g., the video processor 104) of the color depth setting of the non-reference picture.

However, when the color depth CD1 of each color component in the encoded video bitstream V_IN is an 8-bit color depth and the display color depth is also an 8-bit color depth (i.e., the color depth of the encoded video bitstream V_IN is equal to the display color depth of the display apparatus 101), the video decoder 300 is instructed by the color depth control signal SC to enable another video decoding mode for outputting the decoded video pictures (sequence) V_IN'$_1$ including reference pictures (e.g., P1', P2' and P4') and non-reference pictures (e.g., P3'), where each color component in the reference pictures and the non-reference pictures has the same color depth CD1 (i.e., 8-bit color depth) possessed by the encoded video bitstream V_IN.

As shown in FIG. 1, the video processor 104 is coupled to the control unit 108 and the storage device 106. After the decoded video pictures (sequence) V_IN'$_1$/V_IN'$_2$ is generated from the video decoder 102 to the storage device 106, the video processor 104 is arranged for referring to the color depth control signal SC to enable a target video processing mode selected from a plurality of supported video processing modes respectively corresponding to different output color depths, and processing picture data derived from the decoded video pictures (sequence) V_IN'$_1$/V_IN'$_2$ buffered in the storage device 106 under the target video processing mode to generate output video pictures (sequence) V_OUT$_1$/V_OUT$_2$ to the display apparatus 101. Specifically, when each color component in the encoded video bitstream V_IN has the color depth CD1 (e.g., 8-bit color depth) equal to the display color depth of the display apparatus 101, the video processor 104 is instructed by the color depth control signal SC to enable one video processing mode to perform predetermined video processing operations (e.g., noise reduction and frame rate conversion) upon picture data of the decoded video pictures (sequence) V_IN'$_1$ and accordingly generate the output video pictures (sequence) V_OUT$_1$ having each color component with the color depth CD1 equal to the display color depth of the display apparatus 101. The output video pictures (sequence) V_OUT$_1$ may be regarded as another decoded video pictures (sequence) derived from processing the decoded video pictures (sequence) V_IN$_1$. When each color component in the encoded video bitstream V_IN has the color depth CD1 (e.g., 10-bit/12-bit/16-bit color depth) different from (e.g., higher than) the display color depth of the display apparatus 101, the video processor 104 is instructed by the color depth control signal SC to enable another video processing mode to perform predetermined video processing operations (e.g., noise reduction and frame rate conversion) upon picture data of the decoded video pictures (sequence) V_IN'$_2$ and accordingly generate the output video pictures (sequence) V_OUT$_2$ having each color component with the color depth CD2 (e.g., 8-bit color depth) equal to the display color depth of the display apparatus 101. Similarly, the output video pictures (sequence) V_OUT$_2$ may also be regarded as another decoded video pictures (sequence) derived from processing the decoded video pictures (sequence) V_IN$_2$. It should be noted that when the video decoder 102 is implemented using the video decoder 200 shown in FIG. 2, all color components in each picture of the decoded video pictures (sequence) V_IN'$_2$ have the color depth CD2 (e.g., 8-bit color depth) equal to the display color depth of the display apparatus 101, and the video processor 104 does not need to perform any color depth truncation, and may directly retrieve the pixel data with a lower color depth from the storage device 106. However, when the video decoder 102 is implemented using the video decoder 300 shown in FIG. 3, all color components in each reference picture of the decoded video pictures (sequence) V_IN'$_2$ have the color depth CD1 (e.g., 10-bit/12-bit/16-bit color depth) different from the display color depth of the display apparatus 101, and the video processor 104 is required to perform color depth truncation upon the processed reference pictures before transmitting the processed reference pictures to the display apparatus 101.

In above exemplary design, the detection unit 110 is arranged for generating the detection result DR by detecting configuration information of the display apparatus 101. Alternatively, the detection unit 110 may generate the detection result DR by detecting system resource information (e.g., system performance condition) of the video processing apparatus 100. For example, the detection unit 110 may be configured to detect loading of the video processor 104, bandwidth of the storage device 106 and/or footprint usage of the storage device 106. If the video processing apparatus 100 is disposed in a portable device such as a mobile phone, the video processing apparatus 100 is generally powered by a battery. Thus, the detection unit 110 may be further configured to generate the detection result DR by detecting the battery life.

When the detection result DR indicates that none of loading of the video processor 104, bandwidth of the storage device 106, footprint usage of the storage device 106 and battery life of a battery which powers the video processing apparatus 100 is lower than the specific level, the control unit 108 generates the color depth control signal SC to instruct the video decoder 102 to generate the decoded video pictures (sequence) $V\_IN'_1$ with the same color depth CD1 possessed by the encoded video bitstream V_IN, and also generates the color depth control signal SC to instruct the video processor 104 to process the decoded video pictures (sequence) $V\_IN'_1$ with the color depth CD1 and accordingly generate the output video pictures (sequence) V_OUT with the color depth CD1.

However, when the detection result DR indicates that at least one of loading of the video processor 104, bandwidth of the storage device 106, footprint usage of the storage device 106 and battery life of a battery which powers the video processing apparatus 100 is lower than the specific level, the control unit 108 generates the color depth control signal SC to instruct the video decoder 102 to generate the decoded video pictures (sequence) $V\_IN'_2$ with the color depth CD2 different from (e.g., lower than) the color depth CD1 of the encoded video bitstream V_IN, and also generates the color depth control signal SC to instruct the video processor 104 to process the decoded video pictures (sequence) $V\_IN'_2$ with the color depth CD2 and accordingly generate the output video pictures (sequence) V_OUT with the color depth CD2. In this way, the performance of the video processing apparatus 100 can be optimized under the restricted system resource/performance condition.

In above exemplary designs, the control unit 108 sets the color depth control signal SC according to the detection result DR. Hence, the video processing apparatus 100 requires the detection unit 110 to actively detect the configuration information of the display apparatus or system resource information of the video processing apparatus. In an alternative design, the aforementioned detection unit 110 may be omitted. Please refer to FIG. 4, which is a block diagram illustrating a video processing apparatus according to a second embodiment of the present invention. The major difference between the video processing apparatuses 100 and 400 is that the control unit 408 of the video processing apparatus 400 sets the color depth control signal SC by reading a pre-defined system setting PRESET or receiving a user input USER_IN. For example, the user input USER_IN may be entered by a user through a remote control, and the pre-defined system setting PRESET may be obtained from an eFuse, a bonding option or a switch setting. For example, if the configuration information (e.g., the display color depth) of the display apparatus 101 can be known beforehand, the user may manually inform the control unit 408 of the configuration information, or the configuration information may be programmed or stored in the video processing apparatus 400. Similarly, based on the color depth control signal SC, the video decoder 102 enables a target video decoding mode selected from a plurality of supported video decoding modes respectively corresponding to different output color depths, and the video processor 104 enables a target video processing mode selected from a plurality of supported video processing modes respectively corresponding to different output color depths. As a person skilled in the art can readily understand operations of the video decoder 102 and the video processor 104 in the video processing apparatus 400 after reading above paragraphs directed to the video processing apparatus 100, further description is omitted here for brevity.

As mentioned above, the video decoder 102 is capable of supporting different output color depths and is controlled by the color depth control signal SC to select one of the output color depths. Thus, the video decoder 102 may decode the encoded video bitstream V_IN with the color depth CD1 to generate either the decoded video pictures (sequence) $V\_IN_1'$ with all pictures using the same color depth CM or the decoded video pictures (sequence) $V\_IN_2'$ with some or all of the pictures having a different color depth CD2. In an alternative design, a video decoder supporting a single color depth may be employed. Please refer to FIG. 5, which is a block diagram illustrating a video processing apparatus according to a third embodiment of the present invention. The major difference between the video processing apparatuses 100 and 500 is that the video decoder 502 of the video processing apparatus 500 only supports an output color depth equal to the color depth of each component in the encoded video bitstream V_IN, and is not controlled by the color depth control signal SC generated from the control unit 108. Assuming that the color depth of each color component in the encoded video bitstream V_IN is a 10-bit/12-bit/16-bit color depth, the video decoder 502 is designed to decode the encoded video bitstream V_IN according to a corresponding 10-bit/12-bit/16-bit color depth, and generates the decoded video pictures (sequence) $V\_IN'_1$ with the same color depth (e.g., the 10-bit/12-bit/16-bit color depth) possessed by the encoded video bitstream V_IN. When the display color depth of the display apparatus 101 is equal to the color depth (e.g., a 10-bit/12-bit/16-bit color depth) of each color component in the encoded video bitstream V_IN or none of loading of the video processor 104, bandwidth of the storage device 106, footprint usage of the storage device 106 and battery life of a battery which powers the video processing apparatus 100 is lower than a specific level, the video processor 104 is instructed by the color depth control signal SC to enable one video processing mode to process the decoded video pictures (sequence) $V\_IN'_1$ read from the storage device 106, and accordingly generate the output video pictures (sequence) $V\_OUT_1$ with the color depth equal to the 10-bit/12-bit/16-bit color depth of the encoded video bitstream V_IN. However, when the display color depth of the display apparatus 101 is different from (e.g., lower than) the color depth (e.g., the 10-bit/12-bit/16-bit color depth) of each color component in the encoded video bitstream V_IN or at least one of loading of the video processor 104, bandwidth of the storage device 106, footprint usage of the storage device 106 and battery life of a battery which powers the video processing apparatus 100 is lower than the specific level, the video processor 104 is instructed by the color depth control signal SC to enable another video processing mode to employ bit truncation for deriving decoded video pictures (sequence) $V\_IN'_2$ from the decoded video pictures (sequence) V_IN'$_1$ buffered in the storage device 106, wherein the color depth of the decoded video pictures (sequence) V_IN'$_2$ is different from (e.g., lower than) the color depth of the decoded video pictures (sequence) V_IN'$_1$. In one exemplary bit truncation design, the video processor 104 directly reads 10/12/16-bit pixel data of the decoded video pictures (sequence) V_IN'$_1$ from the storage device 106, and then truncates each 10/12/16-bit pixel data of the decoded video pictures (sequence) V_IN'$_1$ to thereby obtain the decoded video pictures (sequence) V_IN'$_2$ composed of 8-bit pixel data. In another bit truncation exemplary design, the video processor 104 directly reads a portion of each 10/12/16-bit pixel data (e.g., 8 most significant bits of each pixel data) of the decoded video pictures (sequence) V_IN'$_1$ from the storage device 106 to thereby obtain the decoded video pictures (sequence) V_IN'$_2$ composed of 8-bit pixel data. In one alternative design, the video processor 104 may employ the proposed bit truncation operation to obtain video data with a lower color depth from the encoded video bitstream V_IN buffered in the storage device 106. In another alternative design, the video processor 104 reads the decoded video pictures (sequence) V_IN'$_1$ from the storage device 106, processes the decoded video pictures (sequence) V_IN'$_1$, and then apply bit truncation upon processed video pictures (sequence) with the 10-bit/12-bit/16-bit color depth to thereby generate output video pictures (sequence) V_OUT$_2$ with the 8-bit color depth.

Figure 5:
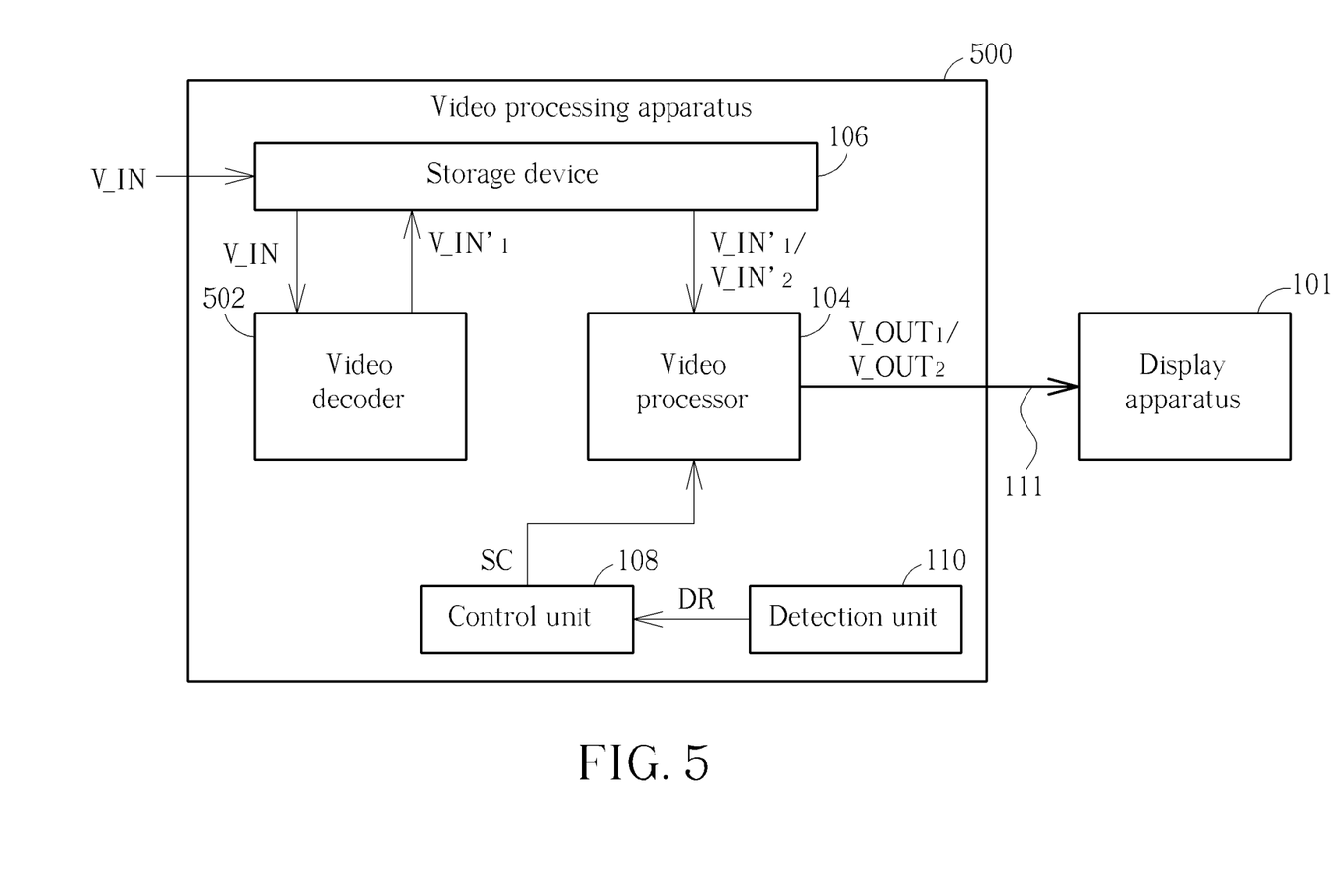
FIG. 5 is a block diagram illustrating a video processing apparatus according to a third embodiment of the present invention.

For example, the color depth of each color component in pictures of the decoded video pictures (sequence) V_IN'$_2$ is equal to the display color depth (e.g., an 8-bit color depth) of the display apparatus 101. Hence, the video processor 104 processes the decoded video pictures (sequence) V_IN'$_2$, and accordingly generates the output video pictures (sequence) V_OUT$_2$ with the color depth equal to the 8-bit display color depth of the display apparatus 101. In this way, the same objective of mitigating or avoiding the computing resource overhead and/or unnecessary power consumption is achieved.

Figure 4:
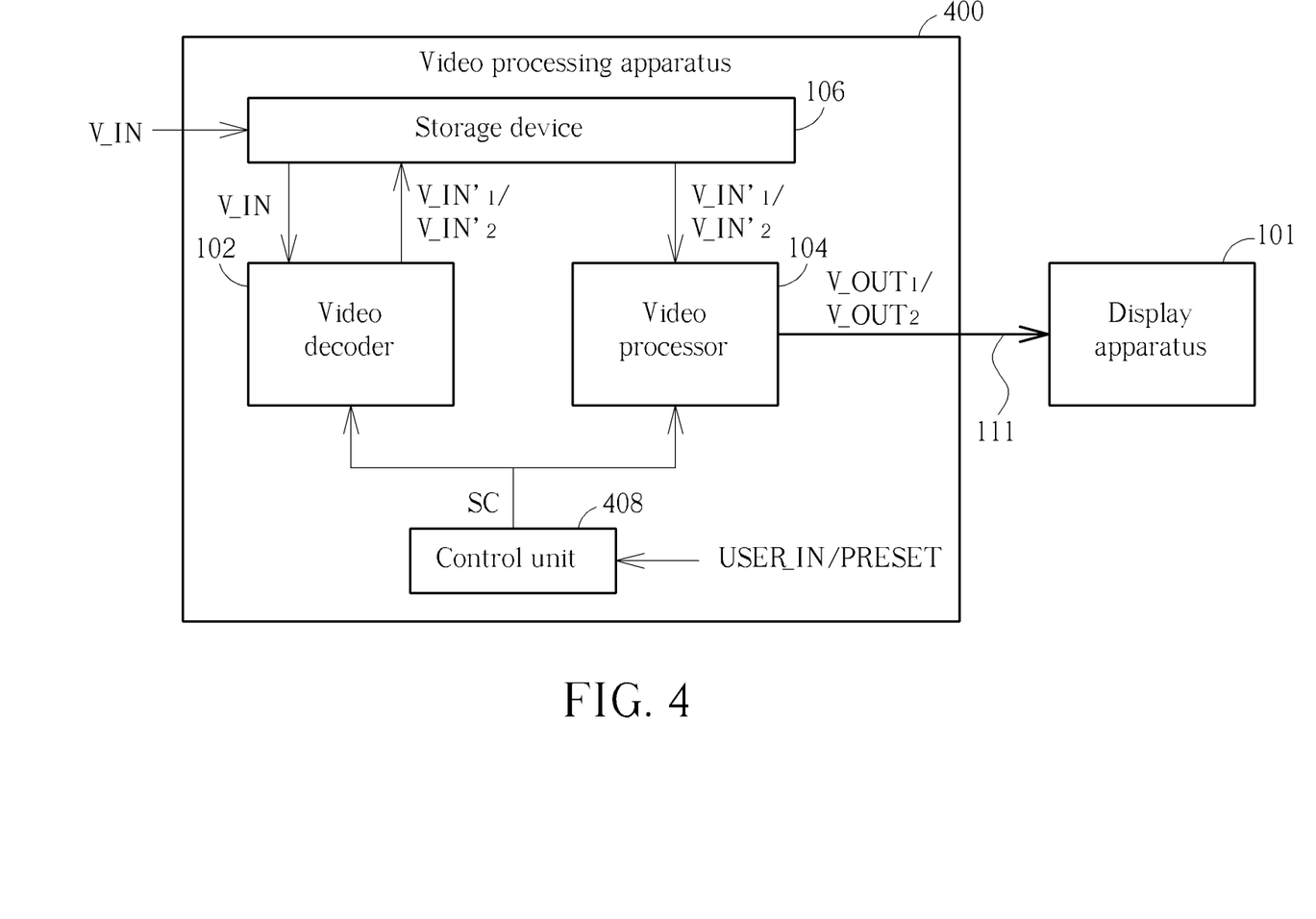
FIG. 4 is a block diagram illustrating a video processing apparatus according to a second embodiment of the present invention.
Figure 6:
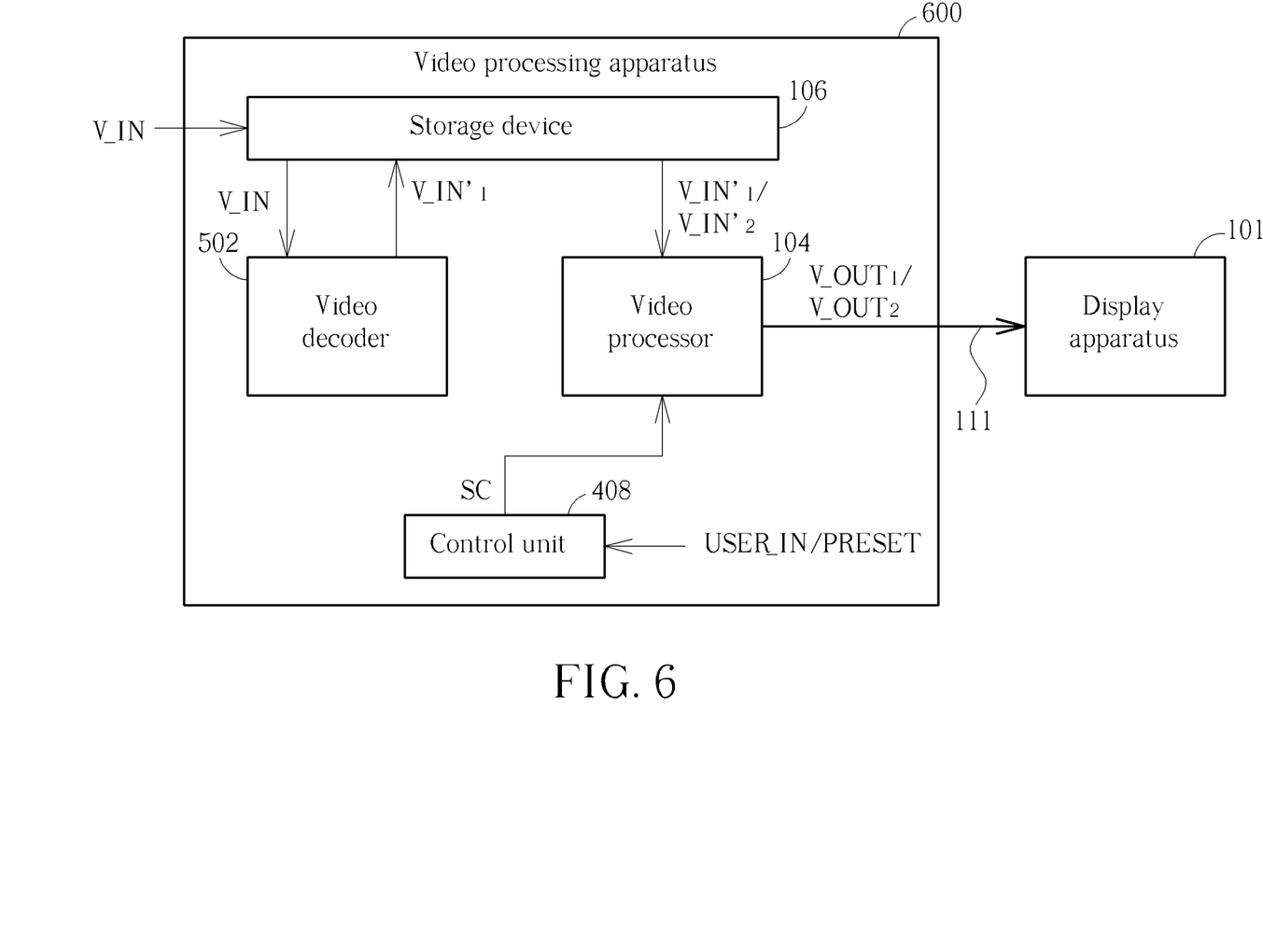
FIG. 6 is a block diagram illustrating a video processing apparatus according to a fourth embodiment of the present invention.

Please refer to FIG. 6, which is a block diagram illustrating a video processing apparatus according to a fourth embodiment of the present invention. The major difference between the video processing apparatuses 400 and 600 is that the video decoder 502 of the video processing apparatus 600 only supports an output color depth equal to the color depth of each component in the encoded video bitstream V_IN, and is not controlled by the color depth control signal SC generated from the control unit 408. The same objective of mitigating or avoiding the computing resource overhead and/or unnecessary power consumption is achieved. As a person skilled in the art can readily understand operational principles of the video processing apparatus 600 after reading above paragraphs directed to the video processing apparatuses 400 and 500, further description is omitted here for brevity.

In some applications, the video processing apparatus 100/400/500/600 and the display apparatus 101 maybe disposed in the same electronic device. However, this is not meant to be a limitation of the present invention. For example, in other applications, the video processing apparatus 100/400/500/600 may be disposed in an external apparatus (e.g., a set-top box) connected to an electronic device where the display apparatus 101 is disposed.

In above embodiments, the video processing apparatuses 100, 400, 500, 600 have one video processor 104 acting as a display engine which supports a plurality of video processing modes respectively corresponding to different output color depths. Alternatively, a video processing apparatus may be configured to have multiple video processors each supporting a plurality of video processing modes respectively corresponding to different output color depths. For example, a video processing which acts as a video encoder supporting a plurality of video processing modes respectively corresponding to different output color depths may be employed.

Figure 7:
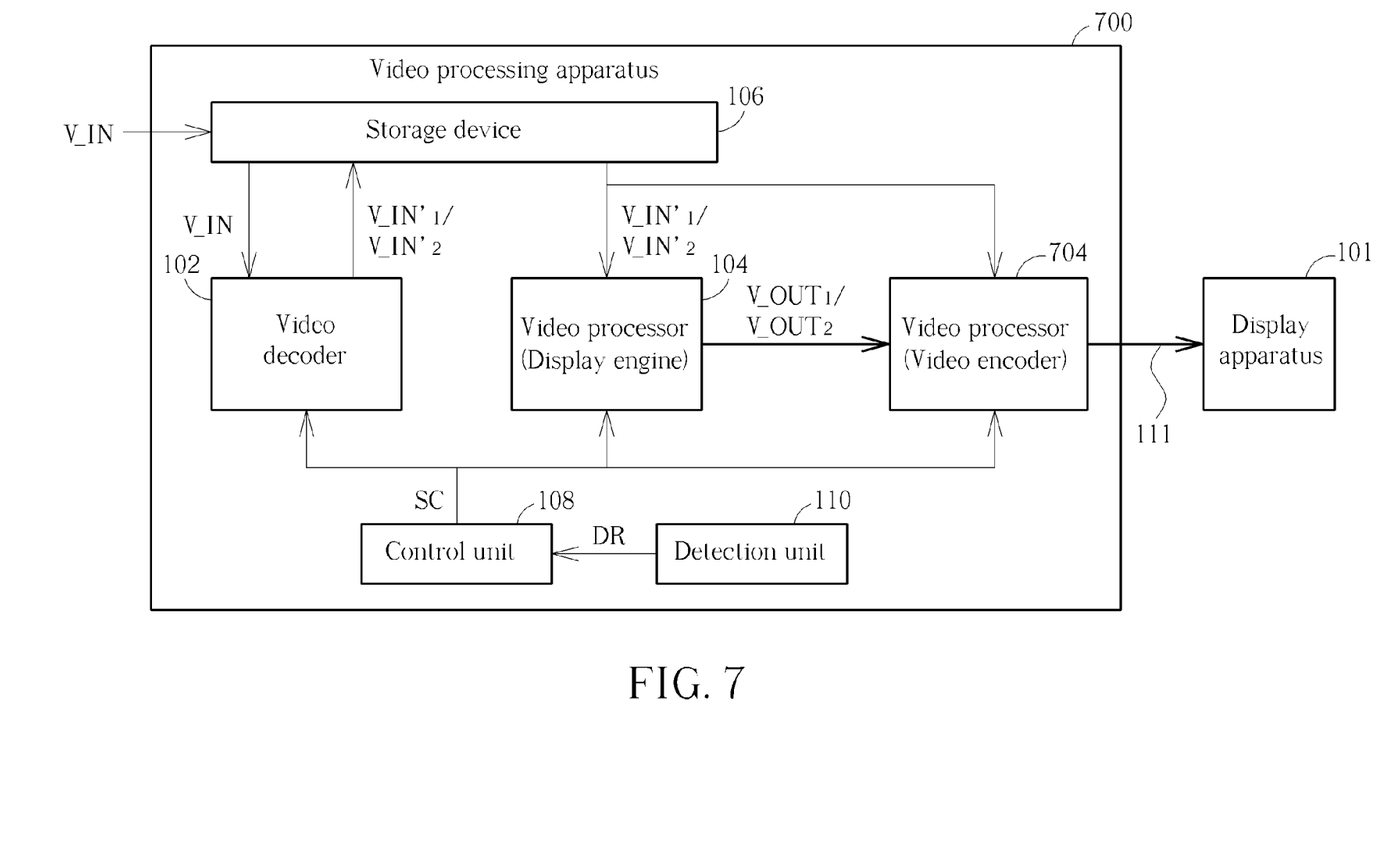
FIG. 7 is a diagram is a block diagram illustrating a video processing apparatus according to a fifth embodiment of the present invention.

FIG. 7 is a diagram is a block diagram illustrating a video processing apparatus according to a fifth embodiment of the present invention. The major difference between the video processing apparatuses 100 and 700 is that the video processing apparatus 700 has a video encoder implemented using a video processor 704 operated in response to the color depth control signal SC. As shown in FIG. 7, the video processor 704 may encode video data generated from the preceding video processor 104 or video data directly read from the storage device 106. For example, the video processing apparatus 700 is used in a WiFi display application for displaying/sharing video contents of a source device on a destination device through a WiFi link. Specifically, the encoded video bitstream V_IN is received from the source device, the display apparatus 101 is located at the destination device, and the display interface 111 is a WiFi display interface. In this embodiment, the video processor 704 refers to the color depth control signal SC to enable a target video processing mode selected from a plurality of supported video processing modes (i.e., video encoding modes) respectively corresponding to different output color depths. Next, the video processor 704 performs a video encoding operation upon the output video pictures (sequence) V_OUT$_1$/V_OUT$_2$ generated from the display engine (i.e., the video processor 104) or the decoded video pictures (sequence) V_IN'$_1$/V_IN'$_2$ directly read from the storage device 106, and accordingly generates an encoded bitstream to the display apparatus 101 through the WiFi display interface 111. Specifically, when the output video pictures (sequence) V_OUT$_1$ or the decoded video pictures (sequence) V_IN'$_1$ are encoded by the video processor 704, the resultant encoded bitstream would have the first color depth CD1; and when the output video pictures (sequence) V_OUT$_2$ or the decoded video pictures (sequence) V_IN'$_2$ are encoded by the video processor 704, the resultant encoded bitstream would have the second color depth CD2. In a case where the display color depth of the display apparatus 101 is different from (e.g., lower than) the color depth (e.g., the 10-bit/12-bit/16-bit color depth) of each color component in the encoded video bitstream V_IN or at least one of loading of the video processor 704, bandwidth of the storage device 106, footprint usage of the storage device 106 and battery life of a battery which powers the video processing apparatus 700 is lower than a specific level, the video processor 704 is instructed by the color depth control signal SC to enable a proper video processing mode to generate the encoded bitstream having each color component with the color depth CD2 (e.g., 8-bit color depth) equal to the display color depth of the display apparatus 101. In this way, the computing resource overhead and/or unnecessary power consumption can be mitigated or avoided.

Figure 8:
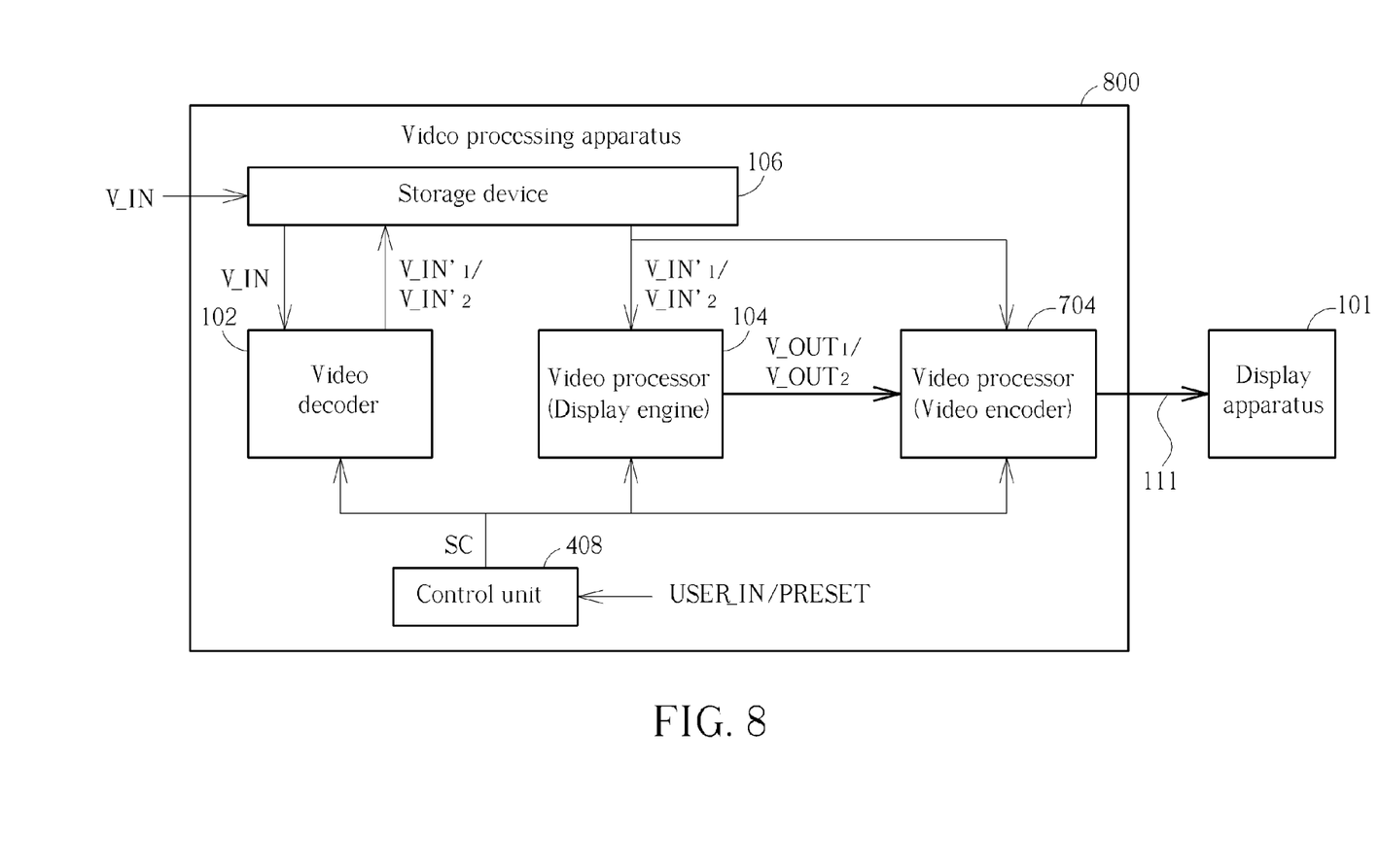
FIG. 8 is a diagram is a block diagram illustrating a video processing apparatus according to a sixth embodiment of the present invention.

In above exemplary design, the control unit 108 sets the color depth control signal SC according to the detection result DR. Hence, the video processing apparatus 700 requires the detection unit 110 to actively detect the configuration information of the display apparatus or system resource information of the video processing apparatus 700. In an alternative design, the aforementioned detection unit 110 may be omitted. Please refer to FIG. 8, which is a block diagram illustrating a video processing apparatus according to a sixth embodiment of the present invention. The major difference between the video processing apparatuses 700 and 800 is that the control unit 408 of the video processing apparatus 800 sets the color depth control signal SC by reading a pre-defined system setting PRESET or receiving a user input USER_IN. As a person skilled in the art can readily understand operational principles of the video processing apparatus 800 after reading above paragraphs directed to the video processing apparatuses 400 and 700, further description is omitted here for brevity.

Figure 9:
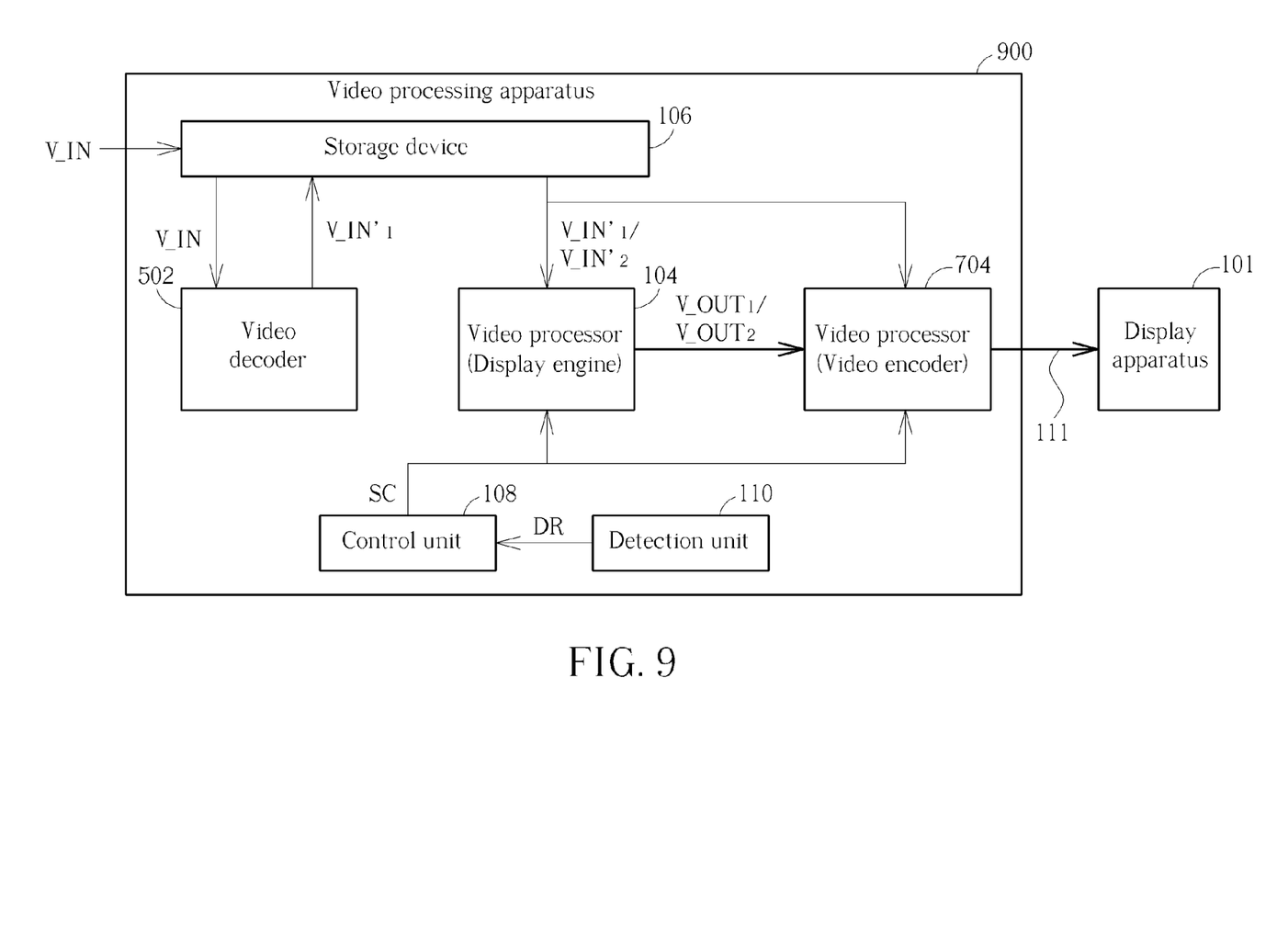
FIG. 9 is a diagram is a block diagram illustrating a video processing apparatus according to a seventh embodiment of the present invention.

FIG. 9 is a block diagram illustrating a video processing apparatus according to a seventh embodiment of the present invention. The major difference between the video processing apparatuses 500 and 900 is that the video processing apparatus 900 has a video encoder implemented using the aforementioned video processor 704. Hence, either the display engine (i.e., the video processor 104) or the video encoder (i.e., the video processor 704) would be used to perform the desired color depth truncation when the display color depth of the display apparatus 101 is different from (e.g., lower than) the color depth (e.g., the 10-bit/12-bit/16-bit color depth) of each color component in the encoded video bitstream V_IN or at least one of loading of the video processor 104/704, bandwidth of the storage device 106, footprint usage of the storage device 106 and battery life of a battery which powers the video processing apparatus 900 is lower than a specific level. For example, when the video processor 704 is used for color depth truncation, the video processor 704 may encode output video pictures (sequence) $V\_OUT_1$ (which is derived from decoded video pictures (sequence) $V\_IN'_1$)/decoded video pictures (sequence) $V\_IN'_1$ with the first color depth CD1 (e.g., 10-bit/12-bit/16-bit color depth) into an encoded bitstream with the second color depth CD2 (e.g., 8-bit color depth). When the video processor 704 is not used for color depth truncation, the video processor 704 may simply encode output video pictures (sequence) $V\_OUT_2$ with the second color depth CD2 (e.g., 8-bit color depth) into an encoded bitstream with the same second color depth CD2 (e.g., 8-bit color depth).

Figure 10:
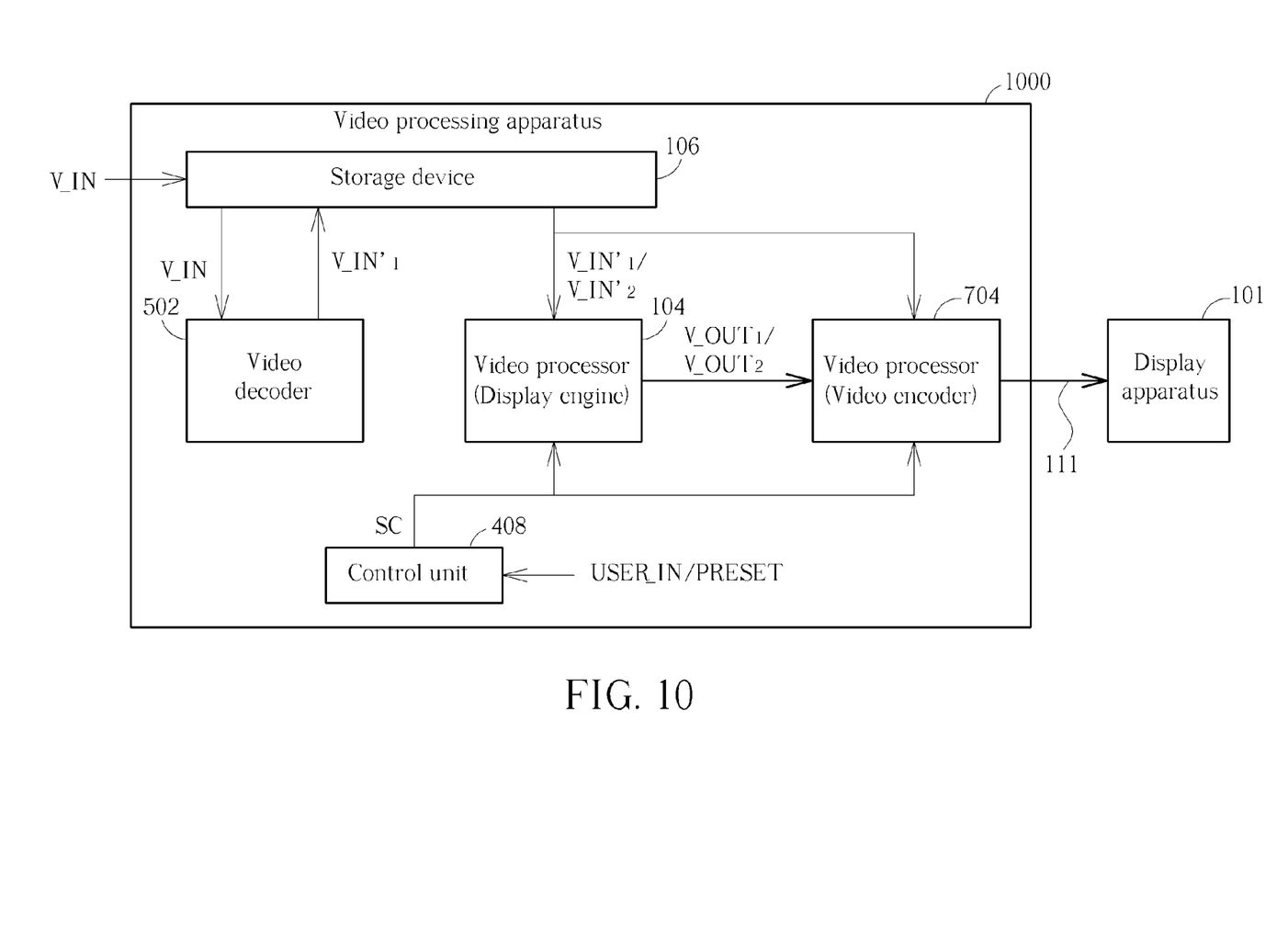
FIG. 10 is a diagram is a block diagram illustrating a video processing apparatus according to an eighth embodiment of the present invention.

Please refer to FIG. 10, which is a block diagram illustrating a video processing apparatus according to an eighth embodiment of the present invention. The major difference between the video processing apparatuses 800 and 1000 is that the video decoder 502 of the video processing apparatus 1000 only supports an output color depth equal to the color depth of each component in the encoded video bitstream V_IN, and is not controlled by the color depth control signal SC generated from the control unit 408. The same objective of mitigating or avoiding the computing resource overhead and/or unnecessary power consumption is achieved. As a person skilled in the art can readily understand operational principles of the video processing apparatus 1000 after reading above paragraphs directed to the video processing apparatuses 800 and 900, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing apparatus, comprising:
a control unit, arranged for generating a color depth control signal;
a storage device;
a video decoder, coupled to the storage device and the control unit, the video decoder arranged for referring to the color depth control signal to enable a target video decoding mode selected from a plurality of supported video decoding modes respectively corresponding to different output color depths, and decoding an encoded video bitstream under the target decoding mode to generate decoded video pictures (sequence) to the storage device; and
a video processor, coupled to at least the storage device, the video processor arranged for processing picture data derived from the decoded video pictures (sequence) buffered in the storage device to generate output video pictures (sequence) to a display apparatus, wherein the encoded video bitstream is not fed into the video processor for decoding.

2. The video processing apparatus of claim 1, wherein the target video decoding mode is enabled when each color component in the encoded video bitstream has a first color depth different from a display color depth of the display apparatus.

3. The video processing apparatus of claim 2, wherein the first color depth is higher than the display color depth of the display apparatus.

4. The video processing apparatus of claim 2, wherein when the target video decoding mode is enabled, each color component in at least a portion of pictures of the decoded video pictures (sequence) has a second color depth equal to the display color depth of the display apparatus.

5. The video processing apparatus of claim 4, wherein when the target video decoding mode is enabled, at least one of an intra-prediction unit, a motion compensation unit and a de-blocking filter of the video decoder is configured to output each color component having the second color depth.

6. The video processing apparatus of claim 4, wherein the video processor directly retrieves the picture data with the second color depth from the storage device.

7. The video processing apparatus of claim 4, wherein when the target video decoding mode is enabled, the video decoder outputs the decoded video pictures (sequence) including reference pictures and non-reference pictures, where each color component in the reference pictures has the first color depth, and each color component in the non-reference pictures has the second color depth.

8. The video processing apparatus of claim 7, the video processor processes each of the reference picture to generate a processed reference picture, and performs color depth truncation upon the processed reference picture.

9. The video processing apparatus of claim 1, wherein the control unit reads a pre-defined system setting to set the color depth control signal.

10. The video processing apparatus of claim 1, wherein the control unit receives a user input to set the color depth control signal.

11. The video processing apparatus of claim 1, further comprising:
a detection unit, coupled to the control unit, the detecting unit arranged for generating a detection result by detecting configuration information of the display apparatus or by detecting system resource information of the video processing apparatus;
wherein the control unit sets the color depth control signal according to the detection result.

12. The video processing apparatus of claim 1, wherein color depth corresponding to the target video decoding mode is less than or equal to color depth of the encoded video bitstream.

13. A video processing apparatus, comprising:
a storage device;
a video decoder, coupled to the storage device, the video decoder arranged for decoding an encoded video bitstream and accordingly generating decoded video pictures (sequence) to the storage device; and
a video processor, coupled to the storage device, the video processor arranged for processing picture data derived from the decoded video pictures (sequence) buffered in the storage device to generate output video pictures (sequence) to a display apparatus, wherein the encoded video bitstream is not fed into the video processor for decoding;
wherein all color components in the encoded video bitstream have a same first color depth higher than a color depth of the decoded video pictures (sequence).

14. The video processing apparatus of claim 13, wherein each color component in the decoded video pictures (sequence) has a second color depth different from the first color depth; and each color component in the picture data read from the decoded video pictures (sequence) in the storage device by the video processor has the second color depth.

15. The video processing apparatus of claim 13, wherein each color component in at least a portion of pictures in the decoded video pictures (sequence) has the second color depth.

16. The video processing apparatus of claim 15, wherein at least one of an intra-prediction unit, a motion compensation unit and a de-blocking filter of the video decoder is configured to output each color component having the second color depth.

17. The video processing apparatus of claim 16, wherein the video processor directly retrieves the picture data with the second color depth from the storage device.

18. The video processing apparatus of claim 15, wherein the video decoder generates the decoded video pictures (sequence) including reference pictures and non-reference pictures, where each color component in the reference pictures has the first color depth, and each color component in the non-reference pictures has the second color depth.

19. The video processing apparatus of claim 18, wherein the video processor processes each of the reference pictures to generate a processed reference picture, and performs color depth truncation upon the processed reference picture.

* * * * *